United States Patent [19]
Ito et al.

[11] Patent Number: 5,377,316
[45] Date of Patent: Dec. 27, 1994

[54] LINE IMAGE GENERATING APPARATUS

[75] Inventors: Kazumasa Ito, Tokyo; Hiroshi Kato, Kanagawa, both of Japan

[73] Assignee: Sony Corporation, Tokyo, Japan

[21] Appl. No.: 930,713

[22] Filed: Aug. 14, 1992

[30] Foreign Application Priority Data

Aug. 23, 1991 [JP] Japan .................................. 3-237393
Jan. 31, 1992 [JP] Japan .................................. 4-046168

[51] Int. Cl.$^5$ .............................................. G06F 3/153
[52] U.S. Cl. .................................................. 395/143
[58] Field of Search ................. 395/143, 141, 142; 345/135, 136; 364/736, 745

[56] References Cited

U.S. PATENT DOCUMENTS

| | | | |
|---|---|---|---|
| 5,003,491 | 3/1991 | Heckt | 364/518 |
| 5,202,960 | 4/1993 | Seiler | 395/143 |
| 5,243,695 | 9/1993 | Russell et al. | 395/143 |
| 5,265,210 | 11/1993 | Vatti et al. | 395/143 |

OTHER PUBLICATIONS

IBM TDB, vol. 26, No. 7B, Dec. 1983, USA, pp. 3758–3761, Shepherd: "Method of Improving the Appearance of Displayed Vectors."
IBM TDB, vol. 14, No. 8, Jan. 1972, USA, pp. 2483–2484, Chesarek: "Dash Generator for Digital Vector Generator."

*Primary Examiner*—Phu K. Nguyen
*Attorney, Agent, or Firm*—Limbach & Limbach

[57] ABSTRACT

A line image generating apparatus includes a first register for storing information on a pattern of a segment, a second register for holding first data which is expressed by a fixed decimal point and determined by the ratio between a moving amount on a first axis and a moving amount on a second axis which intersects the first axis, the ratio being variable in each step, a third register for holding second data expressed by a fixed decimal point in a current step, an adder for adding the first and second data and for supplying an output as a result of the addition to the third register, and a selector for selecting an output from the first register as a function of the content of the third register replaced by the output from the adder.

7 Claims, 7 Drawing Sheets

LINE PATTERN
INFORMATION

LINE IMAGE GENERATING APPARATUS

BACKGROUND OF THE INVENTION

1. Field of the Invention

This invention relates to a line image generating apparatus and, in particular, to such an apparatus suitable for generating a line image having a pattern in computer graphics.

2. Description of the Prior Art

An existing apparatus for generating a line image with a certain pattern is shown in FIG. 1.

The line image generating apparatus 51 shown in FIG. 1 is used for expressing a line, for example, in the form of a broken line. The line image generating apparatus 51 outputs line pattern information as shown in FIG. 2 as a rendering control signal, for example, for each bit. In FIG. 2, "0" is attached to pixels of a line not to be rendered while "1" is attached to pixels to be rendered.

In the construction of FIG. 1, the line image generating apparatus 51 consists mainly of a line pattern register (hereinafter called LP register) 52, a counter 53, and a selector 54. The LP register has a capacity of 32 bits and holds line pattern information as shown in FIG. 2 while assigning it to the respective bits. An output from the LP register 52 is applied to the selector 54 by sending 32 bits in parallel.

The counter 53 counts a predetermined clock signal to produce a count value. The count value form the counter 53 is supplied to the selector 54 to behave as a select signal SSL of five bits. The selector 54 selects, from the 32-bit pattern information from the LP register 52, data on one bit in a position designated by the select signal SSL. The one-bit data is taken out from a terminal 55 to behave as a rendering control signal DCO. On the basis of the rendering control signal DCO, a next-stage circuit determines whether to render the corresponding pixel or not.

An example in which a segment is rendered by using the line image generating apparatus 51 is explained below with reference to FIG. 3. If the line pattern information given is as shown under the X axis in FIG. 3, pixels in portions of the line corresponding to bits indicated by "0" in the pattern information are not rendered, while pixels in portions of the line corresponding to bits indicated by "1" in the pattern information are rendered.

In FIG. 3, in the case of lines LO1 to LO3, the X axis is the major axis for lines LO1 to LO3, and the counter 53 increments its count value every time when the process makes progress by one step in the X axis direction. In the case of lines LO4 and LO5, the Y axis is the major axis, and the counter 53 increments its count value every time when the process makes progress by one step in the Y axis direction. As shown in FIG. 3, when any bit in the pattern information is indicated by "0", the lines LO1 to LO5 are displayed, without rendering their pixels corresponding to such bits.

In the line image generating apparatus 51 described above, the select signal SSL for selecting pattern information is created by the counter 53. Therefore, a selected bit in the pattern information is shifted by one bit in each one-step progress, and the pattern represented by the lines LO1 to LO5 rendered varies with inclination of the lines.

Let an example be taken in which lines are rendered on the basis of the same pattern information shown in FIG. 2. As shown in FIG. 3, when the lines LO1 to LO5 have the same start point, each of distances of non-rendered areas AR40 and AR41 from the start point (the origin in the example of FIG. 3) varies with inclinations of the lines LO1 to LO5. Therefore, each of the non-rendered areas AR40 and AR41 represents a reversed L shape, as a whole, which is not a good appearance. In order to improve the appearance of the line, processing by software is employed. However, such processing, which relies upon software increases the amount of operations and decreases the processing speed.

OBJECTS AND SUMMARY OF THE INVENTION

It is therefore an object of the invention to provide a line image generating apparatus in which a pattern of lines to be rendered is not affected by inclinations of the lines.

According to an aspect of the invention there is provided a line image generating apparatus comprising: a first register for storing information on a pattern of a segment; a second register for holding first data which is expressed by a fixed decimal point and determined by a ratio between a moving amount along a first axis and a moving amount along a second axis which intersects the first axis, the ratio being variable in each step; a third register for holding second data expressed by a fixed decimal point in a current step; an adder for adding the first and second data and for supplying an output as a result of the addition to the third register; and a selector for selecting an output from the first register in accordance with the content of the third register replaced by the output from the adder.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
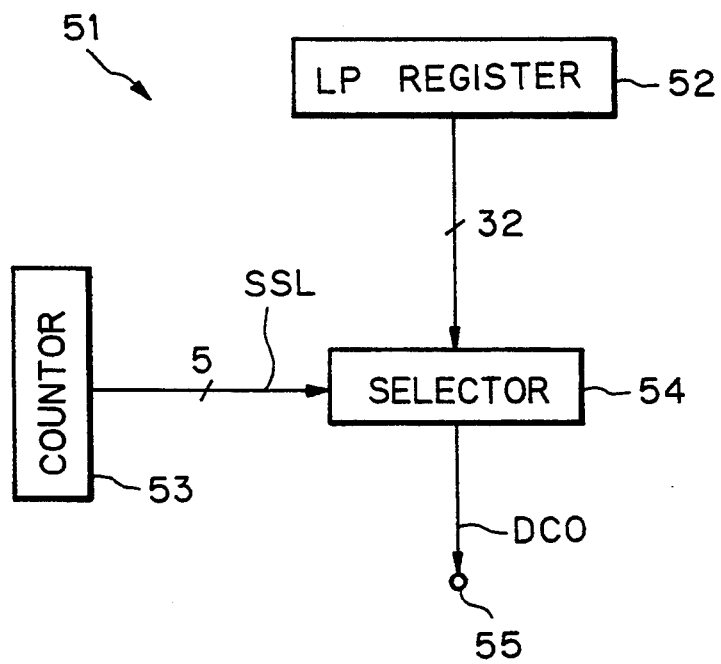
FIG. 1 is a block diagram of a prior art.
Figure 2:
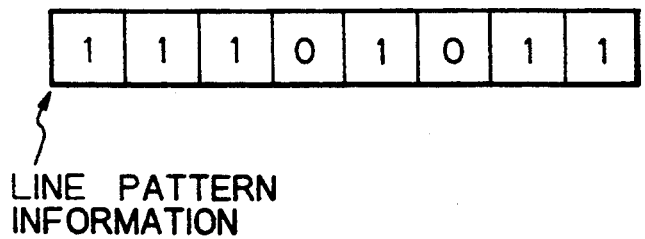
FIG. 2 is an explanatory view of a prior art showing pattern information.
Figure 3:
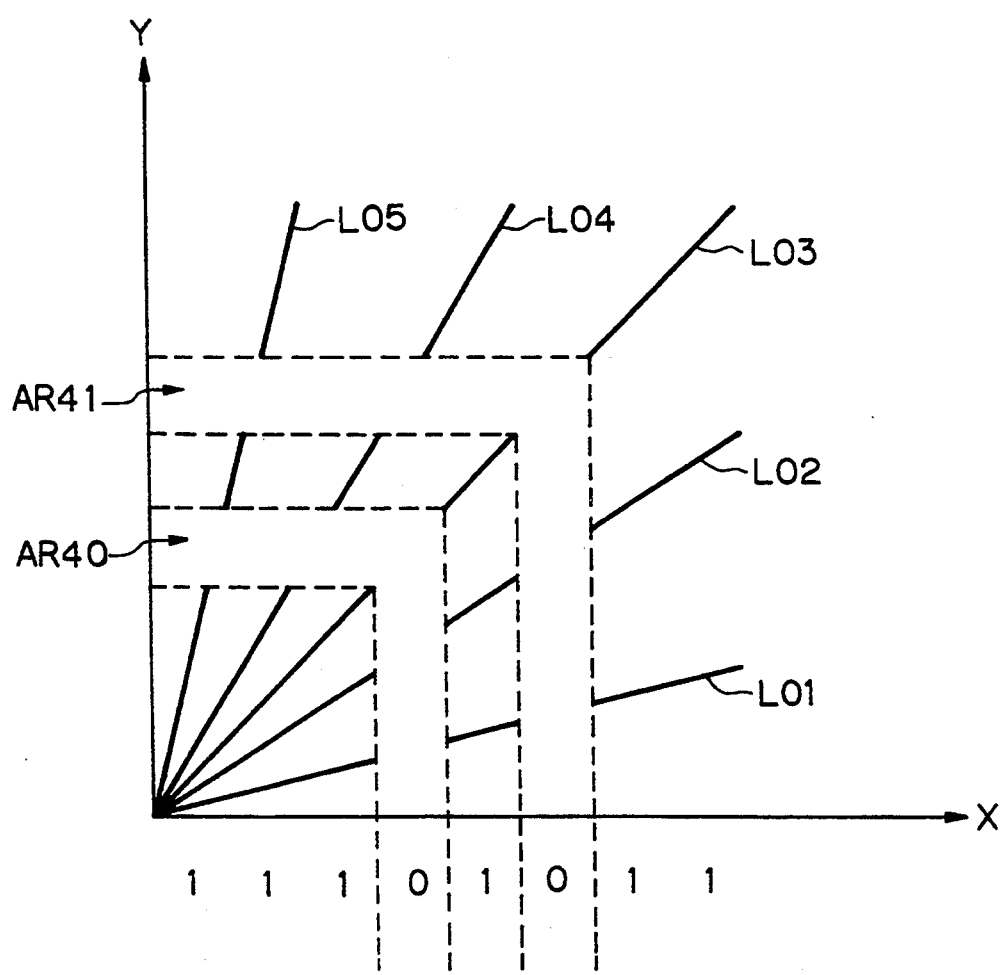
FIG. 3 is a diagram showing an example in which a line image is generated by a prior art.

An embodiment of the invention is explained below with reference to FIGS. 4 to 9. In the description given below, a line image generating apparatus is adopted in a three-dimensional primitive generating system, that is, a line processor. The term "primitive", used in this text, indicates a polygonal rendering element that directly images a polygon such as triangle, rectangle, and so on, or, alternatively, any figure formed by these polygons.

The three-dimensional primitive creating system, that as, the line processor, renders a two-dimensional or three-dimensional primitive at a high speed. More specifically, once the line processor receives rendering parameters, it outputs rendering data for each pixel at the speed of, for example, 25M pixel per second, maximum.

Primitives to be rendered are exemplified by:

| | |
|---|---|
| line (straight line) | two-dimensional, three-dimensional |
| triangle | two-dimensional, three-dimensional |
| elongated rectangle | two-dimensional, three-dimensional |
| polygon | two-dimensional, three-dimensional |
| bit map | two-dimensional |
| pixel map | two-dimensional |
| scan line pixel | three-dimensional |

For example, five types of color outputs, if necessary, may be prepared for the above-indicated rendering primitives:
real color (24 bits)
index color (10 bits)
dither color (3 bits, 4 bits)
XP color (1 bit)

Further, the following attributes may be added if necessary:
line pattern (32 bits)
hatch pattern (16×16 bits)
semi-transparent pattern (4×4 bits)
line width (3, 5)

Figure 4:
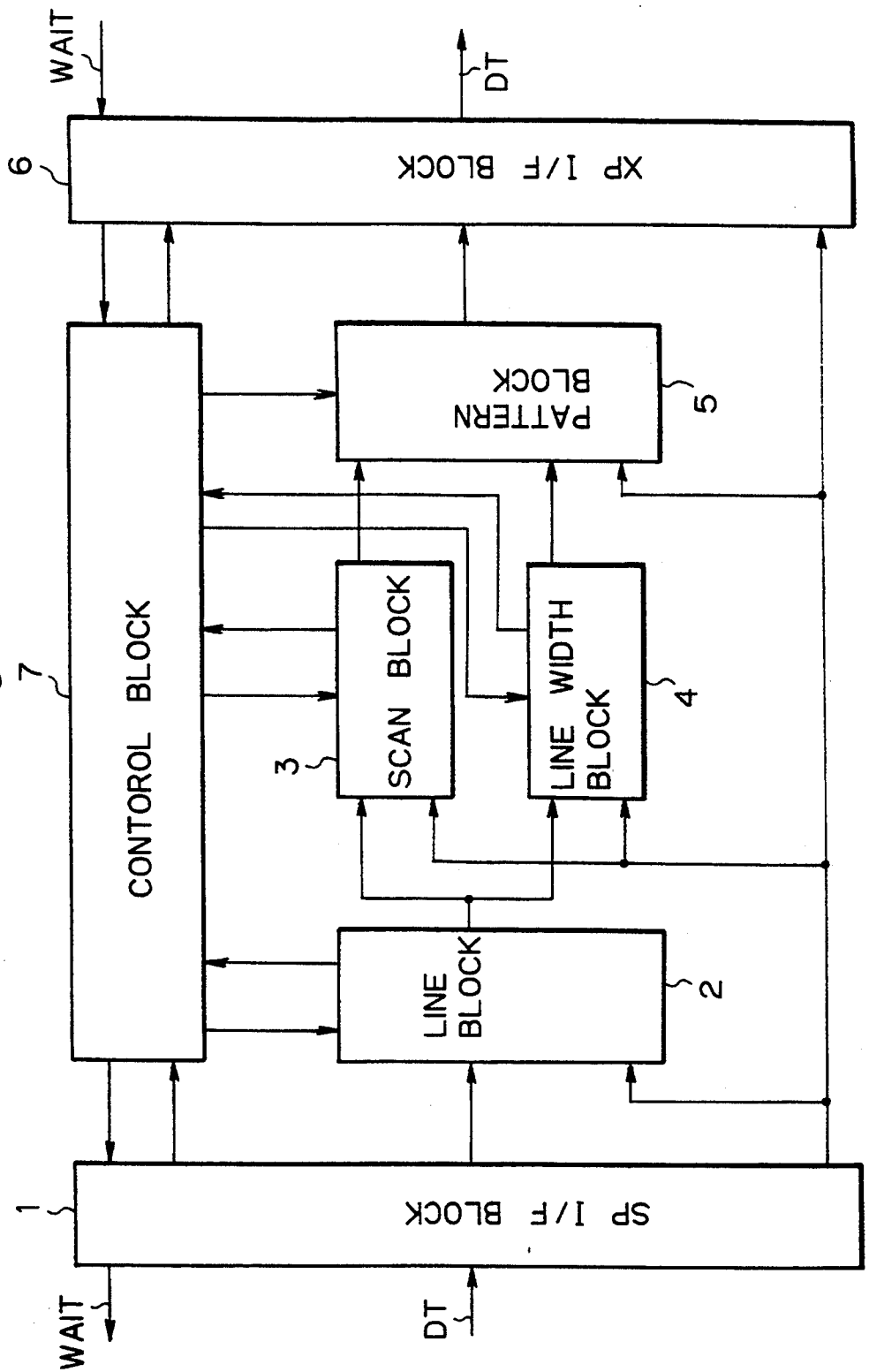
FIG. 4 is a block diagram of the entirety of an embodiment of the invention.

As shown in FIG. 4, the three-dimensional primitive generating system consists mainly of an SP interface block 1, a line block 2, a scan block 3, a line width block 4, a pattern block 5, an XP interface block 6, a control block 7, and so forth.

The SP interface block 1 is for receiving parameters for creating a primitive. The SP interface block 1 decodes an incoming address and outputs various load signals to respective registers and so on. Issue of the load signals is prohibited at certain times. In this case, a wait signal WAIT is output to a former-stage circuit block to interrupt entry of data for a time. When the prohibition is released, a load signal is output and issue of the wait signal WAIT to the former-stage circuit block is stopped.

The line block 2 creates a line and a polygonal contour by using various kinds of algorithm such as Bresenham's algorithm.

The scan block 3 scans the interior of a polygon in the X axis direction. That is, it interpolates received data in the X axis direction. An interpolate circuit is provided for each of data: X, Z, R, G, and B.

The line width block 4 creates a thick line. That is, it renders a certain number of pixels encircling X-Y coordinates given by the line block 2.

The pattern block 5 adds attributes such as line patterns, hatch patterns, semitransparent patterns, dither patterns, and so forth, to a created primitive. More specifically, the pattern block 5 has line patterns, hatch patterns, semitransparent patterns, and dither patterns, and applies these patterns to each pixel to control the rendering of the pixels in accordance with the desired pattern. Since the invention is employed in the pattern block 5, its details will be described later.

The XP interface block 6 outputs a created primitive to a next-stage circuit, for each pixel. The control block 7 controls the entirety of the three-dimensional primitive generating system. The pattern block 5 includes line image generator for generating a line image having a predetermined pattern. Construction of the line image generator is explained below with reference to FIG. 5.

Figure 5:
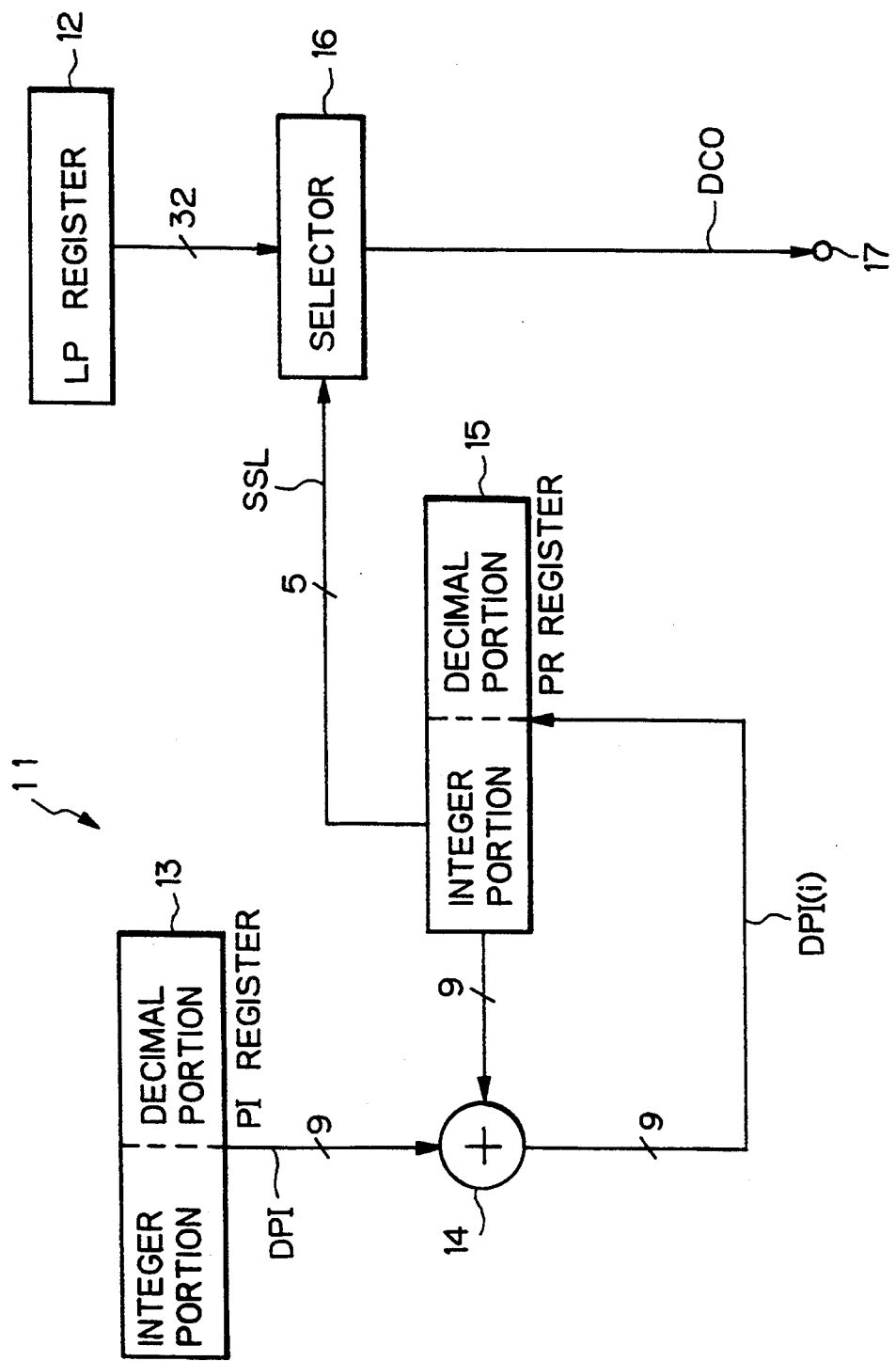
FIG. 5 is a block diagram of a line image generator.

In the construction of FIG. 5, a line image generator 11 consists mainly of an LP register 12, a pattern increment register (hereinafter called PI register) 13, an adder 14, a pattern reference register (hereinafter called PR register) 15, and a selector 16. Numeral 17 denotes a terminal through which an output from the selector 16 is taken out.

Figure 7:
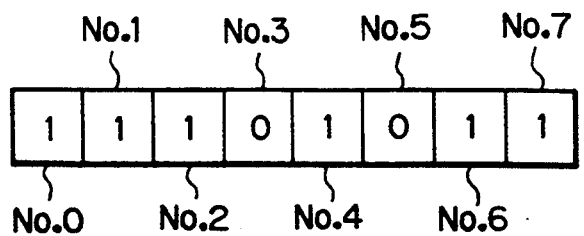
FIG. 7 is an explanatory view showing an example of pattern information.

The LP register 12 has a capacity of 32 bits, and holds pattern information as shown in FIG. 7 while assigning it to the respective bits. Output from the LP register 12 is supplied to the selector 16 by sending 32 bits in parallel.

The PI register 13 holds fixed decimal point data DPI of nine bits. The data DPI held in the PI register 13 is determined on the basis of inclinations of lines, and the data DPI is expressed by:

$$DPI = \sqrt{1 + S^2}$$

where
  s=dy/dx when the X axis is the major axis, and
  s=dx/dy when the Y axis is the major axis.

In the foregoing equation, dx is a variation in the X axis while dy is a variation in the Y axis.

The PI register 13 includes a decimal point between a bit No. 4 and a bit No. 3. As shown in FIG. 5, five most significant bits for an integer portion while four least significant bits for a decimal portion. The integer portion and the decimal portion of the PI register 13 hold an integer portion and a decimal portion of the data DPI, respectively. The data DPI is supplied from the PI register 13 to the adder 14 by sending nine bits in parallel. The adder 14 carries out addition of the data DPI from the PI register 13 and data DP1(i−1) from the PR register explained later. Data DP1(i) as a result of the addition is supplied to the PR register 15.

The PR register 15 can hold fixed decimal point data of nine bits. The PR register 15 latches and holds data DP1(i) made by sequential addition of values of the PI register 13 in the adder 14. The PR register 15 includes a decimal point between a bit No. 4 and a bit No. 3. As shown in FIG. 5, five most significant bits form an integer portion while four least significant bits form a decimal portion. The integer portion and the decimal portion of the PR register 15 hold an integer portion and a decimal portion of fixed decimal point data, respectively.

The PR register 15 supplies the fixed decimal point data to the adder 14 in 9-bit parallel form, and supplies the integer portion to the selector 16 to behave as a select signal SSL. The selector 16 selects, from the 32-bit pattern information supplied from the LP register 12, data on one bit in a position designated by the select signal SSL. The one-bit data is taken out from the terminal 17 to behave as a rendering control signal DCO. On the basis of the rendering control signal DCO, a next-stage circuit determines whether to render a pixel not.

Behavior of the apparatus is explained below with reference to FIGS. 5 to 7. Generation of a line is normally executed by rendering a pixel in a position in a minor axis direction defined by inclination of a line in each progress in a major axis direction by one step (distance between adjacent pixels) from a start point. The line image generator 11 shown in FIG. 5 performs its operation in each progress by one step in the major axis direction.

Figure 6:
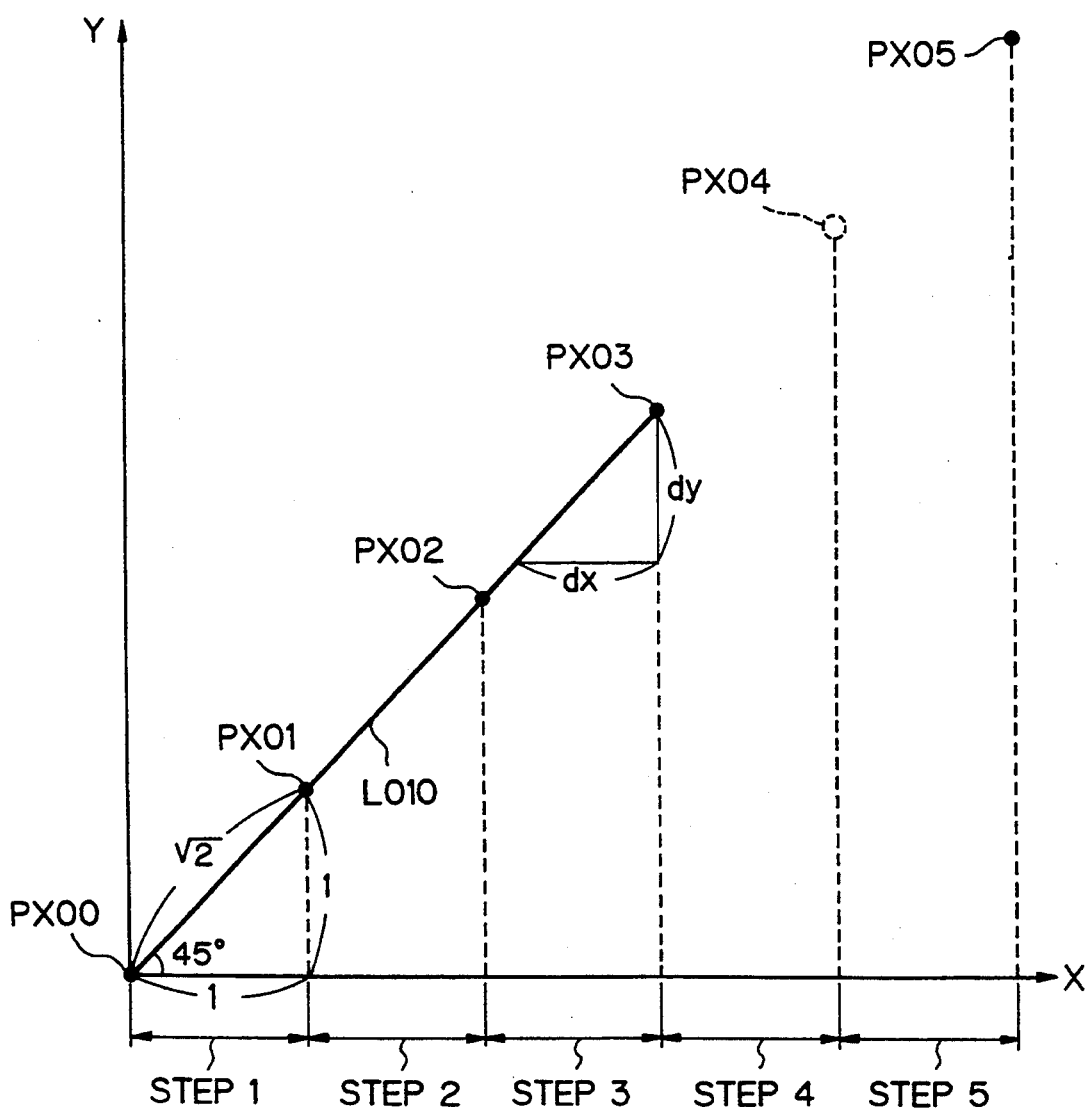
FIG. 6 is an explanatory view for explaining generation of a line image by the line image generator.

In the explanation given below, the pattern information held in the LP register 12 is ["11101011..."] as shown in FIG. 7, and a line LO10 angled from the X axis by 45 degrees as shown in FIG. 6 is rendered. In the example of FIG. 6, the X axis is the major axis and the Y axis is the minor axis. The content of the PR register 15 is to be zero-cleared when the start point of the line LO10 is generated.

Operation of the line image generator 11 is now explained for each step.

(0) 0th Step

If the ratio between the variation dx on the X axis and the variation dy on the Y axis is (1:1), the term s in the foregoing equation (s=dy/dx) becomes (s=1). Therefore, the value of the equation becomes $2^{\frac{1}{2}}$ (1.41421356...), and this value is set as data DPI in the PI register 13. On the other hand, the PR register 15, which has been zero-cleared, supplies the integer portion of the data DP10 (initial value=0), that is, "0", as a select signal SSL to the selector 16. The selector 16 takes out the 0th bit (No. 0="1") designated by the select signal SSL to use it as a rendering control signal DCO, and outputs it through the terminal 17.

If the rendering control signal DCO is "1", the next-stage circuit executes rendering on the basis of data on a pixel then output. If it is "0", the circuit does not render the pixel then issued. In this step, since the rendering control signal DCO is "1", rendering is carried out. Therefore, as shown in FIG. 6, a pixel PX00 is rendered.

(1) First Step

After the pixel PX00 is rendered in the 0th step, the process makes progress by one step (distance between adjacent pixels) in the major axis (X axis) direction. At the timing of arrival at a position where a pixel PX01 is to be rendered, the rendering control signal DCO is output as explained below.

The adder 14 is fed with the data DPI held in the PI register 13 and the data DP10 held in the PR register 15. In the adder 14, the data DPI and the data DP10 are added, and new data DP11 is created. The data DP11 is (DP11=DPI+DP10) which is, specifically, (DP11=0+1.14142=1.4142). The data DP11 indicative of a result of the addition is latched by the PR register 15. Therefore, the content of the PR register is replaced by the data DP11.

The PR register 15 supplies an integer portion of the data DP11, that is, "1", to the selector 16 for use as a select signal SSL. The selector 16 takes out the first bit (No. 1="1") designated by the select signal SSL as a rendering control signal DCO, and outputs it through the terminal 17. In the first step, since the rendering control signal DCO is "1", rendering is carried out. Therefore, as shown in FIG. 6, the pixel PX01 is rendered.

(2) Second Step

After the pixel PX01 is rendered in the first step, the process makes progress by one step in the major axis direction. At the timing of arrival at a position where a pixel PX02 is to be rendered, a rendering control signal DCO is output as explained below.

As described above, the adder 14 is fed with the data DPI held in the PI register 13 and the data DP11 held in the PR register 15. In the adder 14, the data DPI and the data DP11 are added, and new data DP12 is created. The data DP12 is (DP12=DPI+DP11) which is, specifically, (DP12=1.4142+1.4142=2.8284). The data DP12 is latched by the PR register 15 as an output indicative of the result of the addition. Therefore, the content of the PR register 15 is replaced by the data DP12.

The PR register 15 supplies an integer portion of the data DP12, that is, "2", to the selector 16 for use as a select signal SSL. The selector 16 takes out the second bit (No. 2="1") designated by the select signal SSL as a rendering control signal DCO, and outputs it through the terminal 17. In the second step, since the rendering control signal DCO is "1", rendering is carried out. Therefore, the pixel PX02 is rendered as shown in FIG. 6.

(3) Third Step

After the pixel PX02 is rendered in the second step, the process makes progress by one step in the major axis direction. At the timing of arrival at a position where a pixel PX03 is to be rendered, a rendering control signal DCO is output as explained below.

The adder 14 is fed with the data DPI held in the PI register 13 and the data DP12 held in the PR register 15. In the adder 14, the data DPI and the data DP12 are added, and new data DP13 is created. The data DP13 is (DP13=DPI+DP12) which is, specifically, (DP13=1.4142+2.8284=4.2426). The data DP13 is latched by the PR register 15 as an output indicative of a result of the addition. Therefore, the content of the PR register 15 is replaced by the data DP13.

The PR register 15 supplies an integer portion of the data DP13, that is, "4", to the selector 16 for use as a select signal SSL. The selector 16 takes out the fourth bit (No. 4 ="1") designated by the select signal SSL as a rendering control signal DCO and outputs it through the terminal 17. In the third step, since the rendering control signal DCO is "1", rendering is carried out. Therefore, as shown in FIG. 6, the pixel PX03 is rendered.

(4) Fourth Step

After the pixel PX03 is rendered in the third step, the process makes progress by one step in the major axis direction. At the timing of arrival at a position where a pixel PX04 is to be rendered, a rendering control signal DCO is output as explained below.

The adder 14 is fed with the data DPI held in the PI register 13 and the data DP13 held in the PR register 15. In the adder 14, the data DPI and the data DP13 are added, and new data DP14 is created. The data DP14 is (DP14=DPI+DP13) which is, specifically, (DP14=1.4142+4.2426=5.6568). The data DP14 is latched by the PR register 15 as an output indicative of a result of the addition. Therefore, the content of the PR register 15 is replaced by the data DP14.

The PR register 15 supplies an integer portion of the data DP14, that is, "5", to the selector 16 for use as a select signal SSL. The selector 16 takes out the fifth bit (No. 5="0") designated by the select signal SSL as a rendering control signal DCO and outputs it through the terminal 17. In the fourth step, since the rendering control signal DCO is "0", rendering is not carried out. Therefore, the pixel PX04 shown by a broken line in FIG. 6 is not rendered.

(5) Fifth Step

The process makes progress by one step in the major axis direction from the fourth step. At the timing of arrival at a position where a pixel PX05 is to be rendered, a rendering control signal DCO is output as explained below.

The adder 14 is fed with the data DPI held in the PI register 13 and the data DP14 held in the PR register 15. In the adder 14, the data DPI and the data DP14 are added, and new data DP15 is created. The data DP15 is (DP15=DPI+DP14) which is, specifically, (DP15=1.4142+5.6568=7.0710). The data DP15 is latched by the PR register 15 as an output indicative of a result of the addition. Therefore, the content of the PR register 15 is replaced by the data DP15.

The PR register 15 supplies an integer portion of the data DP15, that is, "7", to the selector 16 for use as a select signal SSL. The selector 16 latched the seventh bit (No. 7="1") designated by the select signal SSL as a rendering control signal DCO and outputs it through the terminal 17. In the fifth step, since the rendering control signal DCO is "1", rendering is carried out. Therefore, the pixel PX05 is rendered as shown in FIG. 6.

As shown in FIG. 6, a line LO10 formed by the pixels PX00, PX01, PX02, PX03, PX05 . . . , without rendering the pixel 04, is expressed as a broken line in which the segment between the pixels PX03 and PX05 is not rendered.

Although the X axis was the major axis in the foregoing explanation, the major axis varies. For example, if the angle from the X axis is less than 45 degrees, the X axis is taken as the major axis. If the angle from the X axis is larger than 45 degrees, the Y axis is taken as the major axis. Therefore, in the example of FIG. 6, for a line angled from the X axis by more than 45 degrees, processing is carried out for rendering or not rendering a pixel in a corresponding position, every time when the process makes progress by one step in the Y axis direction taken as the major axis.

Figure 8:
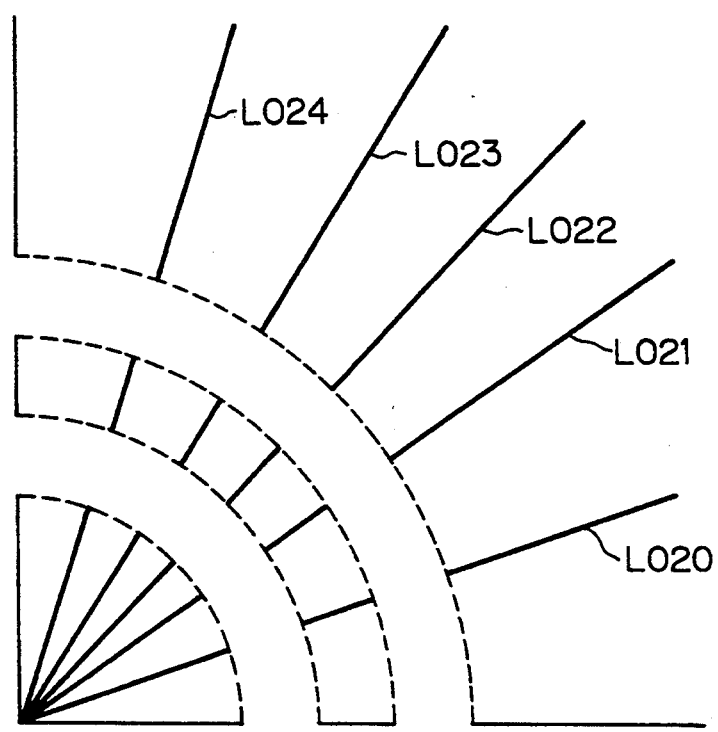
FIG. 8 a diagram showing an example of generation of a line image by the embodiment.

FIG. 8 shows a line pattern which is rendered on the basis of the foregoing steps. Regardless of differences in inclination of the lines LO20 to LO24, their non-rendered portions are located at the same distance from the origin. Therefore, each of the non-rendered portions represent an improved appearance in the form of an arc as shown in FIG. 8. Still referring to FIG. 8, if it is intended to render an extension of, for example, the line LO20, the content of the PR register 15 is not zero-cleared, and the foregoing adding process is continued. If it is intended to render the line LO21 in sequence to the line LO20, after the content of the PR register 15 is cleared, the foregoing adding process is carried out.

Summarizing the embodiment, data DPI indicative of inclination of a line LO10 determined by the ratio between variations dx and dy on the X and Y axes is set in the PI register 13. Then, in each progress by one step, the loop including the PI register 13, the adder 14 and the PR register 15 performs: addition; creation of data DP1(i); storage in the PR register 15; creation of a select signal SSL by using an integer portion of the data DP1(i); selection of one bit data from pattern information held in the LP register 12; and output of the one bit data as a rendering control signal DCO to control rendering of pixels PX01 to PX05. Therefore, a line pattern is maintained unchanged by inclinations of the lines, so that a predetermined pattern is rendered regardless of the inclination of a line, and the appearance of the pattern is improved. In addition, the processing speed is improved.

Figure 9:
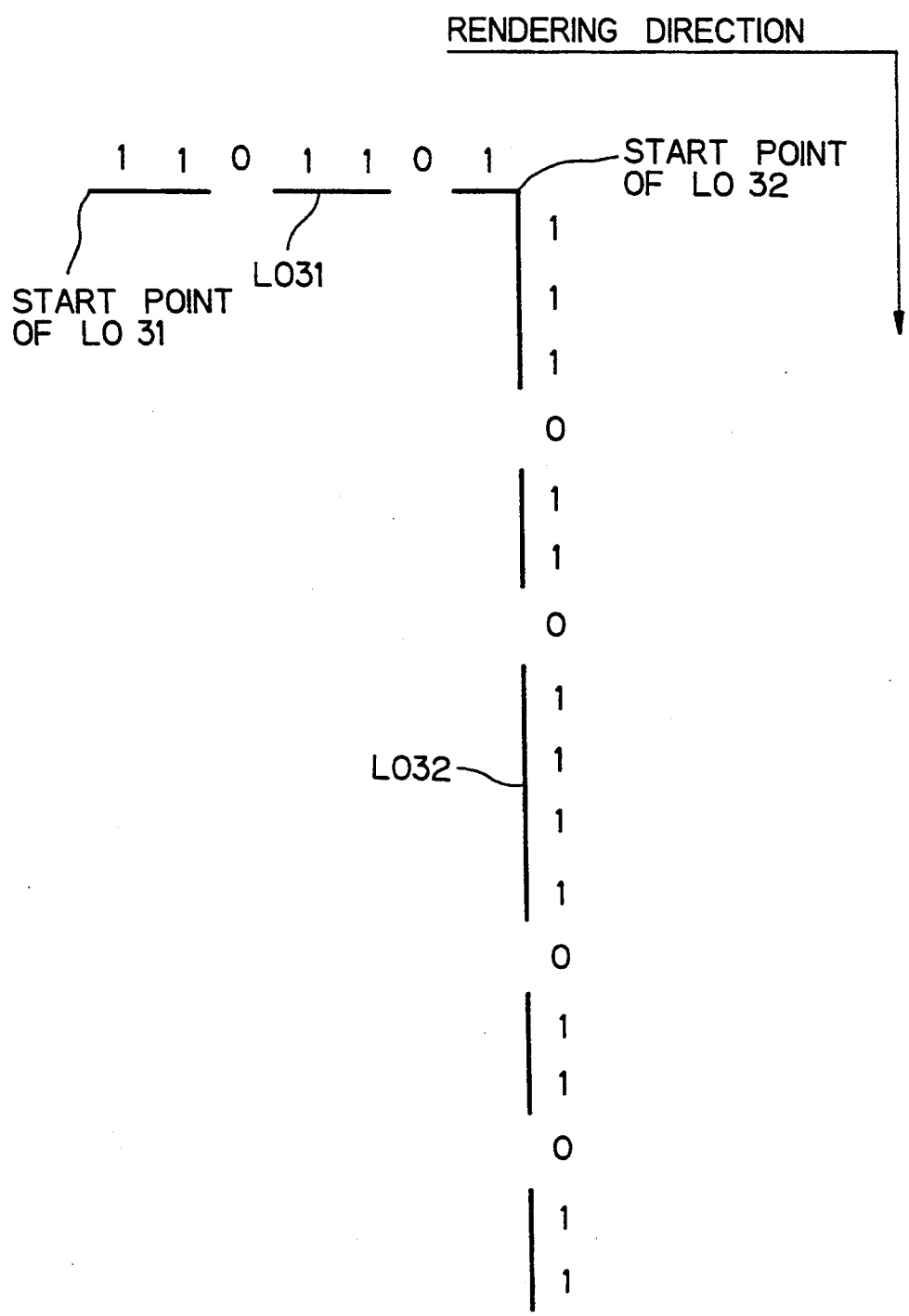
FIG. 9 is a diagram showing generation of a line image by a modified embodiment.

FIG. 9 shows a first modified example of the embodiment for rendering lines LO31 and LO32. The first modified example intends to control whether to zero-clear the content of the PR register by adding one-bit flag upon creating the start point of a line.

If it is intended to render poly-lines having a certain pattern, it is possible to change the content of the PI register 13 without zero-clearing the content of the PR register 15 upon rendering start points of second and subsequent lines. As a result, in a rendering direction shown by an arrow in FIG. 9, for example, polylines can be rendered to form a continuous pattern. For example, the pattern information in FIG. 9 is ("11011011", and lines LO31 and LO32 are formed successively on the basis of the pattern information.

A second modification of the embodiment is explained below. The second modification additionally includes a block in a former stage of the PI register 13 for calculating the foregoing equation, $DPI = \sqrt{1+s}$" in receipt of coordinate data on start and terminal points of a line.

In the same manner as the foregoing equation,
$s = dy/dx$ when the X axis is the major axis, and
$s = dx/dy$ when the Y axis is the major axis.

The line image rendering apparatus according to the invention prevents variation in line pattern with inclinations of lines, and renders a predetermined pattern in an improved appearance with no affection by inclination of the line. In addition, the apparatus improves the processing speed.

What is claimed is:

1. A line image generating apparatus for generating a line within a co-ordinate system defined by two intersecting axes, the line generating apparatus comprising:
   a first register for storing information on a pattern of a segment;
   a second register for holding a first data which is expressed by a fixed decimal point number which is determined at each point on the line to be generated as a function of s, where s is the slope of the line;
   a third register for holding second data expressed by a fixed decimal point number;
   an adder for adding the first data and the second data and for supplying an output as a result of the addition of the first data and the second data to the third register; and
   a selector responsive to a content of the third register replaced by the output from the adder for selecting an output from the first register in accordance with the content of the third register.

2. A line image generating apparatus according to claim 1 wherein points on the line to be generated are determined based on a distance between pixels.

3. A line image generating apparatus according to claim 1 wherein the selector receives an integer portion of the fixed decimal number in the third register.

4. A line image generating apparatus according to claim 3 wherein the selector selects information on a pattern of a segment from the first register as a function of the integer portion of the data supplied from the third register, the selection permitting or prohibiting a pixel to be rendered.

5. The line image generating apparatus of claim 1 wherein the axes defining the co-ordinate system are orthogonal.

6. The line image generating apparatus of claim 5 wherein the fixed decimal point number expressing the first data is determined by the function $\sqrt{1+s}$.

7. The line image generating apparatus of claim 6 wherein the value for s is chosen to minimize its absolute value.

* * * * *

UNITED STATES PATENT AND TRADEMARK OFFICE
CERTIFICATE OF CORRECTION

PATENT NO. : 5,377,316
DATED : December 27, 1994
INVENTOR(S) : Kazumasa Ito and Hiroshi Kato It is certified that error appears in the above-indentified patent and that said Letters Patent is hereby corrected as shown below:

In claim 6, column 8, line 64, please correct the function to read as follows:

$$--\sqrt{1 + s^2}--.$$

Signed and Sealed this

Eighth Day of August, 1995

Attest:

BRUCE LEHMAN

*Attesting Officer*     *Commissioner of Patents and Trademarks*